US008165869B2

(12) United States Patent
Magdalon et al.

(10) Patent No.: US 8,165,869 B2
(45) Date of Patent: Apr. 24, 2012

(54) LEARNING WORD SEGMENTATION FROM NON-WHITE SPACE LANGUAGES CORPORA

(75) Inventors: Josemina Marcolla Magdalon, Jerusalem (IL); Yigal Shai Dayan, Jerusalem (IL); Victoria Mazel, Jerusalem (IL); Daniel Cohen, Har'ei Yehuda (IL)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/953,635

(22) Filed: Dec. 10, 2007

(65) Prior Publication Data

US 2009/0150145 A1   Jun. 11, 2009

(51) Int. Cl.
*G06F 17/27* (2006.01)
*G06F 17/20* (2006.01)
(52) U.S. Cl. .................................. 704/9; 704/8; 704/7
(58) Field of Classification Search .............. 704/7–10
See application file for complete search history.

(56) References Cited

U.S. PATENT DOCUMENTS

| | | | | |
|---|---|---|---|---|
| 5,907,821 A * | 5/1999 | Kaji et al. | ........................... | 704/4 |
| 5,946,648 A * | 8/1999 | Halstead et al. | ................... | 704/9 |
| 6,131,082 A * | 10/2000 | Hargrave et al. | ................... | 704/7 |
| 6,405,161 B1 * | 6/2002 | Goldsmith | ......................... | 704/9 |
| 6,640,006 B2 | 10/2003 | Wu et al. | | |
| 6,968,308 B1 * | 11/2005 | Brockett et al. | .................. | 704/9 |
| 7,263,488 B2 * | 8/2007 | Chu et al. | ....................... | 704/251 |
| 7,996,208 B2 * | 8/2011 | Elbaz et al. | ......................... | 704/8 |
| 2002/0095289 A1 * | 7/2002 | Chu et al. | ........................ | 704/258 |
| 2005/0209844 A1 * | 9/2005 | Wu et al. | ............................... | 704/2 |
| 2005/0234707 A1 * | 10/2005 | Luo et al. | ........................... | 704/9 |

OTHER PUBLICATIONS

Nie et al.("unknown word detection and segmentation of Chinese using statistical and heuristic knowledge", communications of COLIPS, vol. 5. No. 1&2, Dec. 1995, p. 47-57).*
Li et al., "Transductive HMM Based Chinese Text Chunking", Proceedings of Natural Language Processing and Knowledge Engineering, Oct. 26, 2003, pp. 257-262, IEEE, Piscataway NJ, USA.*
Huang, X., Luo, Z. and Tang, J., "A Quick Method for Chinese Word Segmentation," Intelligent Processing Systems, vol. 2, pp. 1773-1776 (1997).*
Wong, P. and Chan, C., "Chinese Word Segmentation Based on Maximum Matching and Word Binding Force," COLING'96, Copenhagen (1996).*
Li et al., "Unsupervised Training for Overlapping Ambiguity Resolution in Chinese Work Segmentation", Proceedings of the Second SIGHAN Workshop on Chinese Language Processing, Jul. 2003, pp. 1-7 http://acl.ldc.upenn.edu/acl2003/sighan/pdfs/LiGao.pdf.

* cited by examiner

*Primary Examiner* — Richemond Dorvil
*Assistant Examiner* — Abdelali Serrou
(74) *Attorney, Agent, or Firm* — Yee & Associates, P.C.; Elissa Y. Wang

(57) ABSTRACT

Illustrative embodiments provide a computer implemented method, apparatus, and computer program product for learning word segmentation from non-white space language corpora. In one illustrative embodiment, the computer implemented method receives text input characters and calculates a ratio-measure for each pair of characters in the input characters. The computer implemented method further determines whether the ratio-measure of each pair of characters is equal to a predetermined threshold value. Responsive to determining the ratio-measure is less than the predetermined threshold value, and a local-minimum value, the computer method further identifies the pair as a weak pair and breaks the weak pair of characters.

15 Claims, 4 Drawing Sheets

Input:

double T = the number of chars in the text.
double Nxy = the number of appearances of the pair in the text.
double Nx = the number of appearances of the first char in the text.
double Ny = the number of appearances of the second char in the text.

Output:

float ratio = (Nxy * T) / (Nx * Ny);

double Nxmy = Nx - Nxy;
double Nmxy = Ny - Nxy;
double Nmxmy = T - Nx - Ny + Nxy;

double Dxy = Nxy*log(Nxy*T/(Nx*Ny));
double Dxmy = Nxmy*log(Nxmy*T/(Nx*(T-Ny)));
double Dmxy = Nmxy*log(Nmxy*T/((T-Nx)*Ny));
double Dmxmy = Nmxmy*log(Nmxmy*T/((T-Nx)*(T-Ny)));

float eRatio = Dxy + Dxmy + Dmxy + Dmxmy;

*FIG. 5*

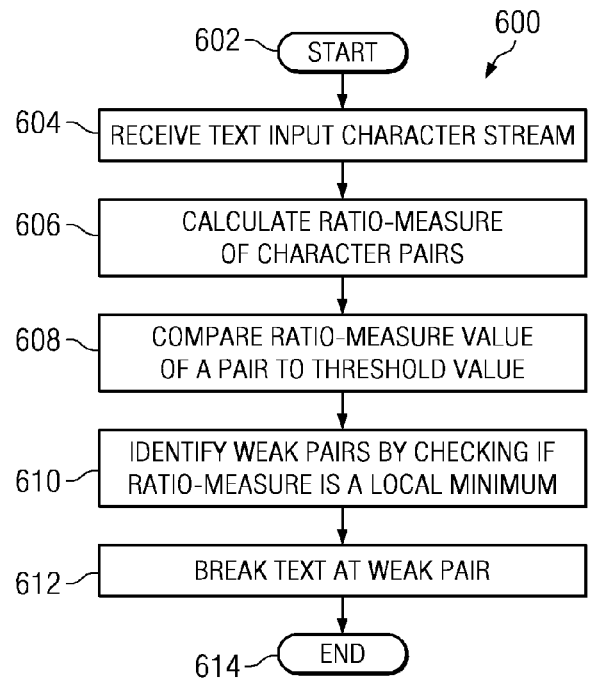

*FIG. 6*

LEARNING WORD SEGMENTATION FROM NON-WHITE SPACE LANGUAGES CORPORA

BACKGROUND OF THE INVENTION

1. Field of the Invention

The present invention relates generally to an improved data processing system and in particular to a computer implemented method, an apparatus, and a computer program product for learning word segmentation from non-white space language corpora.

2. Description of the Related Art

Text tokenization in Asian language scripts is very problematic since the word boundaries are not marked by spaces. In addition a non-white space language, such as Chinese, has no morphological markers and the concept of a word, in a Western language sense, is arguable. The term "non-white space" language simply means the typical use of white spacing to separate words as used in Western languages. The Chinese written languages build from a set of thousands of characters, in which each symbol may represent a morpheme or a syllable. A set refers to a collection of one or more items. For example, a set of characters is one or more characters. In classic Chinese, each character corresponds to one morpheme, which is a meaningful unit of language. Modern Chinese has a tendency to form new words through combining several symbols. Therefore, a Chinese word can consist of more than one character or morpheme, usually two, but there can also be three or more characters. Each morpheme has a certain meaning, but when combined with other morphemes, the original meaning may be altered, which may even change the sentence structure. Thus, any word segmentation should deal with resolving the uncertainty of characters caused by the various combinations of characters.

For example, a previous solution attempted to resolve overlapping ambiguities in Chinese word segmentation using adapted classifiers that could be trained using an unlabelled Chinese text corpus. In this example, an attempt was made to identify Chinese words. In another example, there is provided a facility for selecting, from a sequence of natural language characters, combinations of characters that may be words, using indications, for each character of a sequence of characters. For each of a plurality of contiguous combinations of characters occurring in the sequence, the facility determines whether the character occurring in the second position of the combination is indicated to occur in words that begin with the character occurring in the first position of the combination. Thus, a determination is made to construe words from text analysis.

Tokenization, which may include text segmentation, is a process of demarcating and possibly classifying sections of a string of input characters, whether they are words or other text segments. There are several known tokenization techniques. For example, in one method tokenization can be entirely based on lexical resources and linguistic information. This method is only as accurate as the coverage of the lexicon and the tokenization rules, but may lead to partial processing when there is missing information. In another example, N-gram tokenization is commonly used for text segmentation, such as Chinese, Japanese, and Thai. This method may not always be accurate enough because it does not take into consideration the lexical information, such as that in a lexicon and the linguistic rules.

Therefore, it would be advantageous to have a method, apparatus, and computer program product for breaking text in a manner that overcomes some or all of the problems discussed above.

SUMMARY OF THE INVENTION

Illustrative embodiments provide a computer implemented method, an apparatus in the form of a data processing system, and a computer program product for learning word segmentation from non-white space language corpora. In one illustrative embodiment, the computer implemented method receives text input characters and calculates a ratio-measure for each pair of characters in the input characters and determines whether the ratio-measure of each pair of characters is equal to a predetermined threshold value. The computer implemented method further responsive to determining the ratio-measure less than the predetermined threshold value for an instance of the each pair of characters, and the instance representing a local minimum, identifying the instance of the each pair as a weak pair of characters and breaks the text according to the level of weakness of the pair of characters.

In another illustrative embodiment, the data processing system comprises a bus, a memory connected to the bus, a storage unit connected to the bus, the storage unit having computer usable program code tangibly embodied thereon, a communications unit connected to the bus, a display connected to the bus, a processor unit connected to the bus. The processor unit executes the computer usable program code to direct the data processing system to receive text input characters, calculate a ratio-measure for each pair of characters in the input characters, and determine whether the ratio-measure of each pair of characters is equal to a predetermined threshold value. The processor unit further executes the computer usable program code to direct the data processing system to be responsive to determining the ratio-measure less than the predetermined threshold value for an instance of the each pair of characters, and the instance representing a local minimum, identifying the instance of the each pair as a weak pair of characters, and breaks the text according to the level of weakness of the pair of characters.

In another illustrative embodiment, the computer program product comprises a computer usable recordable medium having computer usable program code tangibly embodied thereon, the computer usable program code comprising computer usable program code for receiving text input characters, computer usable program code for calculating a ratio-measure for each pair of characters in the input characters, and computer usable program code for determining whether the ratio-measure of the each pair of characters is equal to a predetermined threshold value. The computer program product further comprises computer usable program code responsive to determining the ratio-measure less than the predetermined threshold value for an instance of the each pair of characters, and the instance representing a local minimum, identifying the instance of the each pair as a weak pair of characters, and computer usable program code for breaking the text according to the level of weakness of the pair of characters.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a tabular diagram of pseudopodia code of the text break processor of FIG. 3, in accordance with illustrative embodiments;

FIG. 6 is a flowchart of an overview of a text break process of the text break processor of FIG. 3, in accordance with illustrative embodiments.

DETAILED DESCRIPTION OF THE PREFERRED EMBODIMENT

Figure 1:
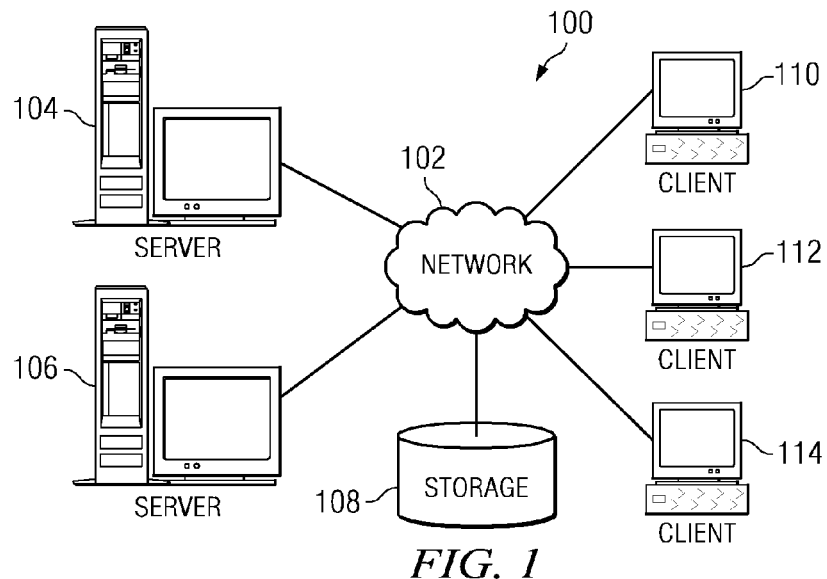
FIG. 1 is a pictorial representation of a network of data processing systems in which illustrative embodiments may be implemented.
Figure 2:
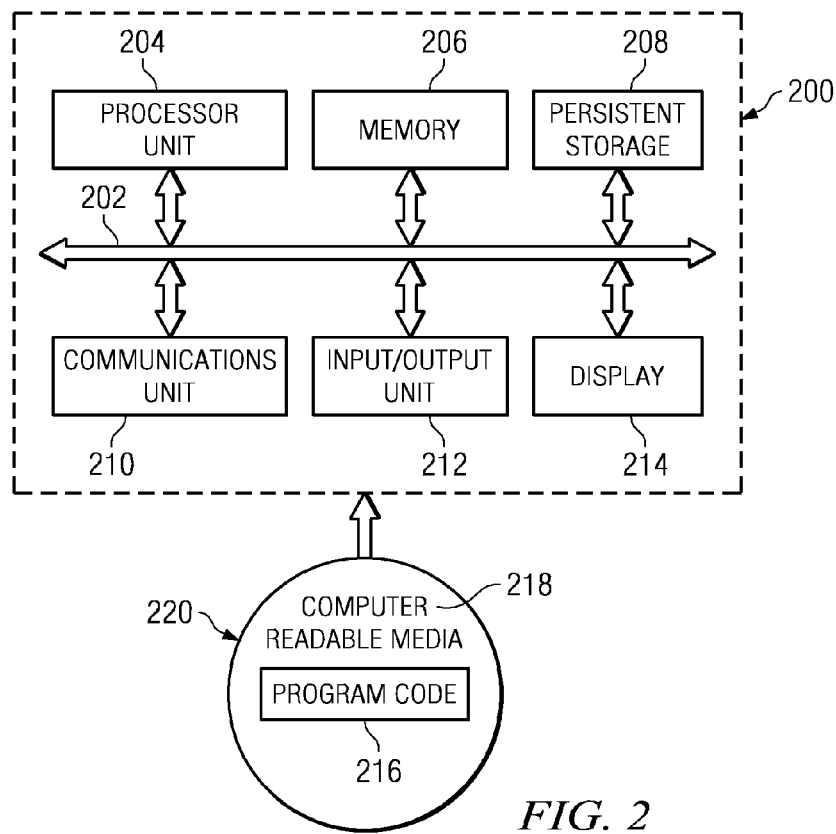
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Illustrated embodiments provide a capability for adaptive identification of word boundaries from corpora based on ratio-measures of pairs of non-white space characters, for example, characters used in support of Asian languages. The adaptive capability provides a knowledge source building tool for detection of word boundaries in languages typically used in locations, such as Chinese, Japanese, and Thai. The illustrated embodiments are directed toward locating a probable breaking point in a sequence of characters such that there is a reduced possibility of a break in a word.

For example, a user located on client 110 may wish to use word breaking to highlight a document obtained from server 104 through network 102. When the document includes non-white space characters, adaptive capabilities for identification of word breaks that may be installed in server 106 may be used to process the document in response to a client request, or the capabilities may also be installed on client 110 as well.

Further, the adaptive capabilities for word breaking may have used a corpora located on storage unit 108 to develop and further adapt the word breaking capabilities. Storage unit 108 may also be used to contain copies of the capabilities for distribution to clients 110-114.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
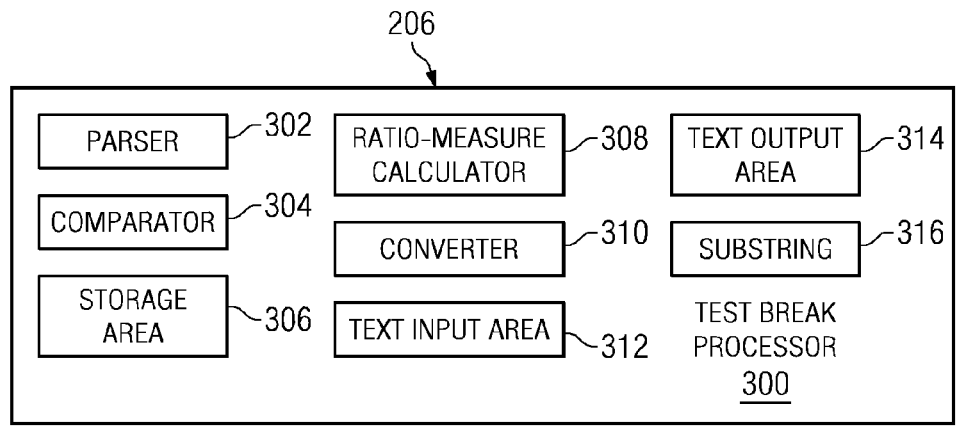
FIG. 3 is a block diagram of a portion of a text break processor in accordance with illustrative embodiments.

With reference to FIG. 3, a block diagram of a portion of a text break processor in accordance with illustrative embodiments is shown. A portion of text break processor 300 is shown, while other components of lesser interest known in the art are not shown. Text break processor 300 is a multi-component entity comprising a parser 302, a comparator 304, a storage area 306, a ratio-measures calculator 308, a converter 310, a text input area 312, a text output area 314, and a substring 316. Text break processor 300 is shown as located within memory 206 of system 200 of FIG. 2, however text break processor 300 may be located on storage unit 108 of FIG. 1 until loaded into memory for use, as is known in the art.

Parser 302 provides a capability to parse text strings comprising a plurality of characters. Characters in many different scripts must be understood by parser 302. Comparator 304 is used to compare a calculated value with that of a threshold value when determining a relative strength of a character pairing. A storage area 306 is used to contain temporal text data during processing and may be used as a work space for intermediate results. The ratio-measures calculator 308 provides a capability to create ratio-measures data for pairs of characters based on the number of occurrences in the text being analyzed.

Converter 310 may be used to convert character data from one code format to another as required. For example, if the text being analyzed is not coded in a usable code, then the text may be converted into a normalized form using Unicode, an industry standard character data code format. Text input area 312 and text output area 314 provides input and output service for the text data being processed by text break processor 300. Text input area 312 and text output area 314 are capable of using communication services of communications unit 210 of FIG. 2. Substring 316 provides a capability to chop a string where desired according to the finding of text break processor 300.

Figure 4:
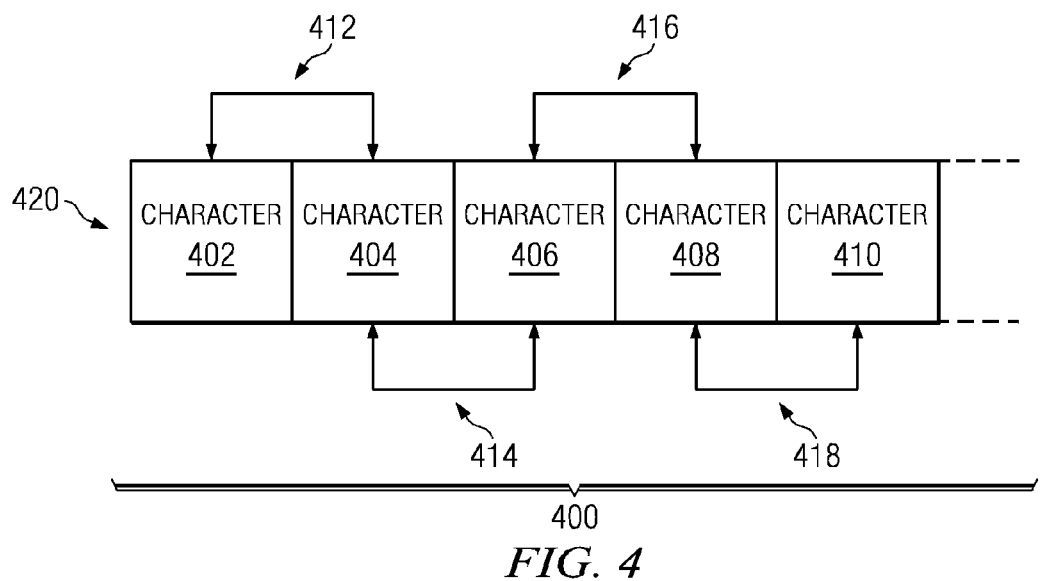
FIG. 4 is a block diagram of a text stream processed by the text break processor of FIG. 3, in accordance with illustrative embodiments.

With reference to FIG. 4, a block diagram of a text stream processed by the text break processor of FIG. 3, in accordance with illustrative embodiments is shown. Text stream 400 comprises a number of discrete characters representative of a particular language script and in a specific coded character set. The text data in the stream is comprised of a number of characters 402-410. Each character is an element in text string 420. Text break processor 300 processes the characters of text string 420 in pairs. A pair of characters is a moving combination in that the first pairing 412 combines characters 402 and 404, while a second pairing 414 combines character 404 and character 406. The pattern is repeated for the third pairing 416 that combines characters 406 and 408, while a fourth pairing 418 combines character 408 and character 410. Parser 302 of FIG. 3 "walks" through the string to provide information in the identification of potential break points. Substring 316 of FIG. 3, waits for instruction to not break the string at an identified "strong pair" point.

With reference to FIG. 5, a tabular diagram of pseudo code of the text break processor of FIG. 3, in accordance with illustrative embodiments is shown. Pseudo code 500 contains representative examples of pseudo code used in illustrative embodiments. For example, statements 502 represent pseudo code used for input data calculations. Output data calculations are performed using remaining statements in pseudo code 500. Statement 504 represents a first ratio calculation. The first ratio, "ratio" is representative of a general quantitative measure of the number of occurrences of the character pairs as compared to the general size of the corpus and the number of occurrences of the individual characters.

Statement 506 represents a second ratio calculation. The second ratio, eRatio, is representative of a probability that the specific pair of characters (x,y) will be found together as compared to the probability that each individual character will be found next to another character. For example, the probability that (x, non-y) or (non-x, y), or (non-x, non-y) will be found together. Here "non-x" specifies a character which is not "x," and "non-y" specifies a character which is not "y." Both calculations are performed by text break processor 300 of FIG. 3 to establish "ratio-measure" values for a given pair of characters. Identifiers "D" and "m" used in the example pseudocode for the code segments related to the eRatio are used to differentiate the statements from those of the ratio segment.

With reference to FIG. 6, a flowchart of an overview of a text break process of the text break processor of FIG. 3, in accordance with illustrative embodiments is shown. The overview of a text break process 600 is an example of a process performed by text break processor 300 of FIG. 3, in accordance with illustrative embodiments.

Process 600 starts (step 602) and receives text input characters for processing (step 604). The input characters are processed in pairs as described to calculate "ratio-measure" of each pair of characters (step 606). The calculated "ratio-measure" for a pair of characters is then compared to a predetermined threshold value (step 608).

For example, in accordance with illustrative embodiments, the following process typically occurs when performing a highlighting operation on a certain character string comprising Chinese characters. The range of characters to highlight around the identified Chinese word to be highlighted is calculated by determining if the current score, using the ratio of the Chinese word to be highlighted, is greater than a predetermined value of fifty. If the score is determined to be greater, then stop and examine characters on either side of the identified word.

For each character pair, determine if the score for the character pair being analyzed is a local minimum score. The local minimum is the lowest score within the range of characters being analyzed. If the score is a local minimum then stop. If the proximity of characters being analyzed from that of the identified word is greater than five characters, then determine if the score, using the e-ratio, is less than ten. When the e-ratio score is less than ten, stop. A probable break point is then determined using either the ratio score or the e-ratio score to indicate a weak pair of characters. Thus weak pairs of characters have low scores and are therefore less likely to occur together in normal usage. In contrast, strong pairs of characters are frequently found together and most likely represent a normal combination of characters. Strong pairs of characters should remain together to preserve the intended meaning of the combination.

Identification of weak pairs is then made based on comparisons made in step 608 and verification that the "ratio-measure" of the current pair is a "local minimum" (step 610). A break in the character string is made according to the location of a weak pair of characters identified in step 610 (step 612) with process 600 terminating thereafter (step 614). Strong pairs of characters are to be kept together.

Figure 7:
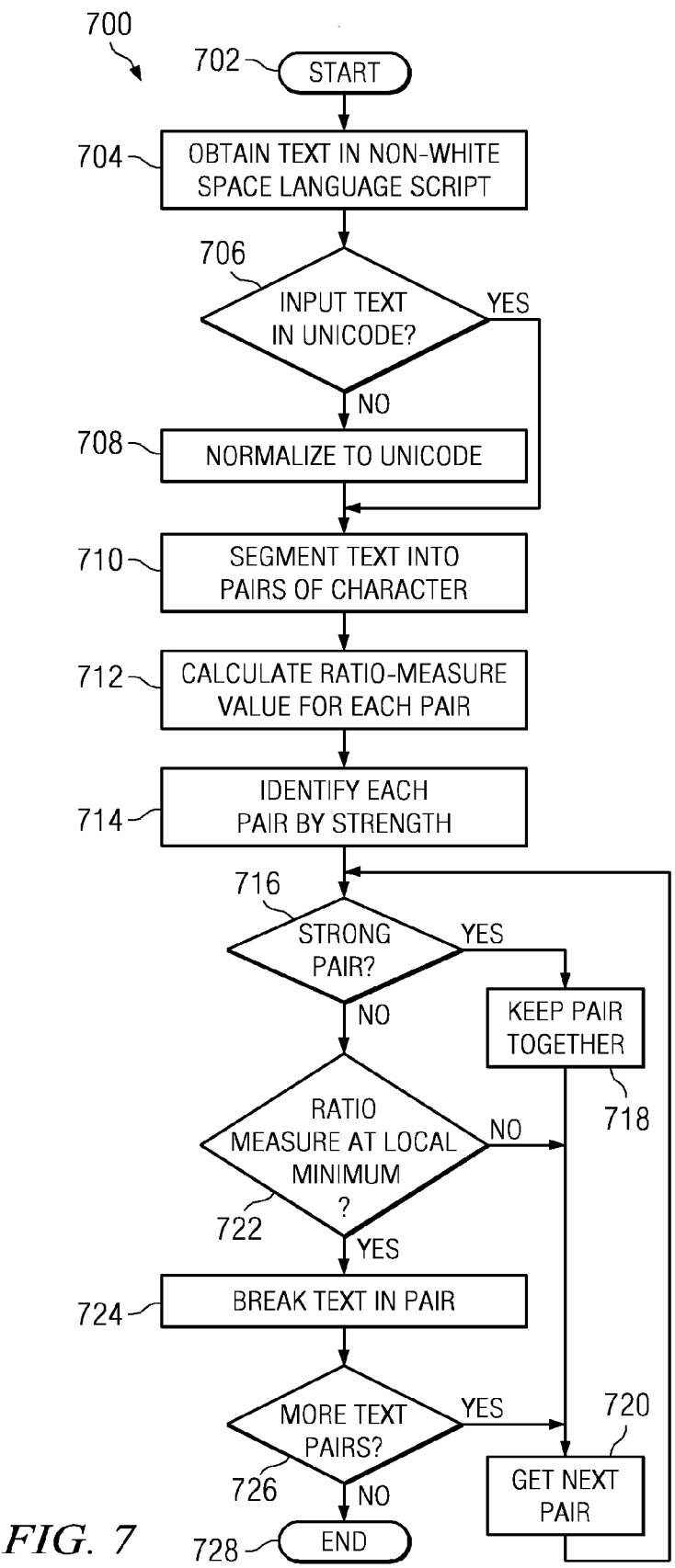
FIG. 7 is a flowchart of the text break process of FIG. 6, in accordance with illustrative embodiments.

With reference to FIG. 7, a flowchart of the text break process of FIG. 6, in accordance with illustrative embodiments is shown. Process 700 is a detailed example of a process of text break processor 300 of FIG. 3, in accordance with illustrative embodiments.

Process 700 starts (step 702) and obtains text in a non-white space language script (step 704). A determination is made whether the input text is in Unicode format (step 706). If the text data is in Unicode, a "yes" result is obtained otherwise a "no" result is obtained in step 706. If a "no" result is obtained, the text data is normalized to Unicode (step 708) and process 700 continues to step 710. If a "yes" result was obtained in step 706, the text is segmented into pairs of characters (step 710).

Character pairs, as described previously, is a moving pairing of text characters as the process moves from the beginning of the text string to the end. A "ratio-measure" value is calculated for each pair (step 712). The "ratio-measure" value for a respective pair is compared to a predetermined value to identify each pair by strength (step 714). A determination is made whether the pair is identified as a strong pair (step 716). If a "yes" is determined in step 716, the pair is kept together (step 718). A next pair is obtained for comparison with the predetermined value (step 720) with process 700 looping back to step 716.

If a "no" was determined in step 716, a determination is made whether there is a "local minimum" value of the "ratio measures" of the adjacent character pairs within a close proximity to the character pair being tested (step 722). If a "no" results in step 722, continue to process the text stream and the next text pair of the remaining pairs is obtained in step 720. A text can be broken within the text pair if the "ratio-measure" of the character pairs is a local minimum (step 724). The text breaking then occurs for a text according to the level of weakness of the pair of characters being processed. A determination is then made whether there is more text to process (step 726).

If a "yes" results in step 726, continue with the text stream to process and the next text pair of the remaining pairs is obtained in step 720. If there are no further pairs to process, for example, the process is at the end of the text, a "no" is returned in step 726, and process 700 terminates thereafter (step 728).

Illustrated embodiments provide a capability for adaptive identification of word boundaries from corpora based on the "ratio-measure" of pairs of non-white space characters, for example, characters used in support of Asian languages. The adaptive capability provides a knowledge source building tool for detection of word boundaries in languages typically used in locations, such as Chinese, Japanese, and Thai. The illustrative embodiment describes capabilities directed toward finding a probable breaking point in a sequence of characters such that there is a reduced possibility of breaking a word.

Illustrative embodiments describe a set of capabilities that may be used on text processing for programmatic document classification and search. Further, implementations of the illustrative embodiments may also be used to provide visualization functionality, such as highlighting significant terms for search of classification, for shallow pattern extraction in text analytics, and for sophisticated text chunking for graphical user interface accurate presentation and string manipulation.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for learning word segmentation from non-white space language corpora, the computer implemented method comprising:
    receiving, by a processing unit, text input characters;
    calculating a ratio of a number of occurrences of each pair of characters in the text input characters to a number of character pairs in the text input characters;
    determining whether the ratio for an instance of the each pair of characters is less than a predetermined threshold value and whether the ratio for the instance represents a lowest ratio for the each pair of characters in the text input characters;
    responsive to determining that the ratio for the instance is less than the predetermined threshold value and that the ratio for the instance represents a lowest ratio for the each pair of characters in the text input characters, identifying the instance of the each pair as a weak pair of characters; and
    breaking the weak pair of characters.

2. The computer implemented method of claim 1, wherein breaking the weak pair of characters comprises identifying a segmentation between words in the text input characters, and wherein receiving the text input characters further comprises:
    determining whether the text input characters are coded in Unicode, and
    responsive to determining the text input characters are coded in a different code than the Unicode, converting the text input characters into the Unicode for processing.

3. The computer implemented method of claim 1, wherein determining whether the ratio for the instance of the each pair of characters is less than the predetermined threshold value further comprises:
    identifying the instance of the each pair of characters as strong;
    keeping the instance of the each pair of characters together; and
    obtaining a next pair of characters.

4. The computer implemented method of claim 1, wherein calculating a ratio of the number of occurrences of the each pair of characters in the input characters to the number of character pairs in the text input characters further comprises calculating input comprising:
    calculating the number of characters in the text input characters;
    calculating the number of occurrences of the each pair in the text input characters;
    calculating the number of appearances of the first character of the each pair in the text input characters; and
    calculating the number of appearances of the second character of the each pair in the text input characters.

5. The computer implemented method of claim 1, wherein calculating a ratio of a number of occurrences of the each pair of characters in the text input characters to the number of character pairs in the text input characters further comprises:
    identifying a first pair of characters in the text input characters from a first two characters of an input string; and
    incrementing a character count by one to identify a next pair of characters in the text input characters; and
    repeatedly incrementing the character count to traverse the text input characters by pairs.

6. A data processing system for learning word segmentation from non-white space language corpora, the data processing system comprising:
    a bus;
    a memory connected to the bus;
    a storage unit connected to the bus, wherein the storage unit having computer usable program code tangibly embodied thereon;
    a communications unit connected to the bus;
    a display connected to the bus;
    a processor unit connected to the bus, wherein the processor unit executes the computer usable program code to direct the data processing system to:
    receive text input characters;
    calculate a ratio of a number of occurrences of each pair of characters in the text input characters to a number of character pairs in the text input characters;
    determine whether the ratio for an instance of the each pair of characters is less than a predetermined threshold value and whether the ratio for the instance represents a lowest ratio for the each pair of characters in the text input characters;
    responsive to determining that the ratio for the instance is less than the predetermined threshold value and that the ratio for the instance represents a lowest ratio for the each pair of characters in the text input characters, identifying the instance of the each pair as a weak pair of characters; and
    break the weak pair of characters.

7. The data processing system of claim 6, wherein the processor unit executes the computer usable program code to direct the data processing system to receive the text input characters further comprising:
    determining whether the text input characters are coded in Unicode, and
    responsive to determining the text input characters are coded in a different code than the Unicode, converting the text input characters into the Unicode for processing.

8. The data processing system of claim 6, wherein the processor unit executes the computer usable program code to direct the data processing system to determine whether the ratio for the instance of the each pair of characters is less than the predetermined threshold value further comprises:
- identifying the instance of the each pair of characters as strong;
- keeping the instance of the each pair of characters together; and
- obtaining a next pair of characters.

9. The data processing system of claim 6, wherein the processor unit executes the computer usable program code to direct the data processing system to calculate a ratio of the number of occurrences of the each pair of characters in the text input characters to the number of character pairs in the text input characters further comprises calculating input comprising:
- calculating the number of characters in the text input characters;
- calculating the number of occurrences of the each pair in the text input characters;
- calculating the number of appearances of the first character of the each pair in the text input characters; and
- calculating the number of appearances of the second character of the each pair in the text input characters.

10. The data processing system of claim 6, wherein the processor unit executes the computer usable program code to direct the data processing system to calculate a ratio of a number of occurrences of the for each pair of characters in the text input characters to the number of character pairs in the text input characters further comprising:
- identifying a first pair of characters in the text input characters from a first two characters of an input string; and
- incrementing a character count by one to identify a next pair of characters in the text input characters; and
- repeatedly incrementing the character count to traverse the text input characters by pairs.

11. A computer program product for learning word segmentation from non-white space language corpora, the computer program product comprising a non-transitory computer usable recordable medium having computer usable program code tangibly embodied thereon, the computer usable program code comprising:
- computer usable program code for receiving text input characters;
- computer usable program code for calculating a ratio of a number of occurrences of each pair of characters in the text input characters to a number of character pairs in the text input characters;
- computer usable program code for determining whether the ratio for an instance of the each pair of characters is less than a predetermined threshold value and whether the ratio for the instance represents a lowest ratio for the each pair of characters in the text input characters;
- computer usable program responsive to determining that the ratio for the instance is less than the predetermined threshold value and that the ratio for the instance represents a lowest ratio for the each pair of characters in the text input characters, identifying the instance of the each pair as a weak pair of characters; and
- computer usable program code for breaking the weak pair of characters.

12. The computer program product of claim 11, wherein computer usable program code for receiving text input characters further comprises:
- computer usable program code for determining whether the text input characters are coded in Unicode, and
- computer usable program code responsive to determining the text input characters are coded in a different code than the Unicode, for converting the text input characters into the Unicode for processing.

13. The computer program product of claim 11, wherein computer usable program code for determining whether the ratio for the instance of the each pair of characters is less than the predetermined threshold value further comprises:
- computer usable program code for identifying the instance of the each pair of characters as strong;
- computer usable program code for keeping the instance of the each pair of characters together; and
- computer usable program code for obtaining a next pair of characters.

14. The computer program product of claim 11, wherein computer usable program code for calculating a ratio of the number of occurrences of the each pair of characters in the input characters to the number of character pairs in the text input characters further comprises computer usable program code for calculating input comprising:
- computer usable program code for calculating the number of characters in the text input characters;
- computer usable program code for calculating the number of appearances of the each pair in the text input characters;
- computer usable program code for calculating the number of occurrences of the first character of the each pair in the text input characters; and
- computer usable program code for calculating the number of appearances of the second character of the each pair in the text input characters.

15. The computer program product of claim 11, wherein computer usable program code for calculating a ratio of a number of occurrences of the each pair of characters in the text input characters to the number of character pairs in the text input characters further comprises:
- computer usable program code for identifying a first pair of characters in the text input characters from a first two characters of an input string; and
- computer usable program code for incrementing a character count by one to identify a next pair of characters in the text input characters; and
- computer usable program code for repeatedly incrementing the character count to traverse the text input characters by pairs.

* * * * *